Figure 4:
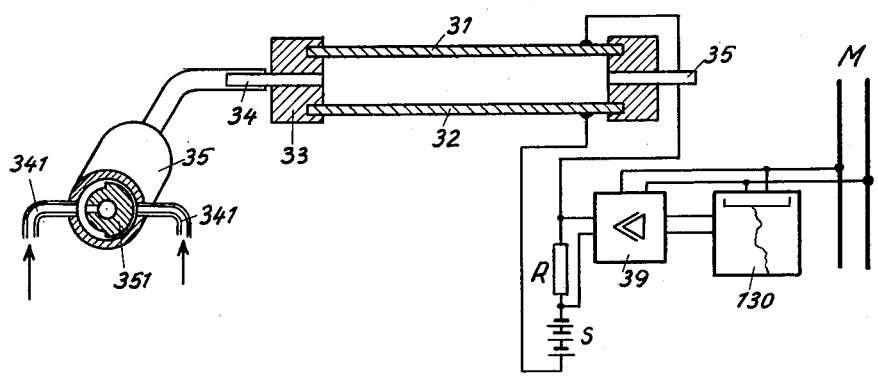

April 24, 1962 H. HUMMEL 3,031,616
APPARATUS FOR ANALYZING GASEOUS OR LIQUID MIXTURES
Filed July 14, 1958 2 Sheets-Sheet 1
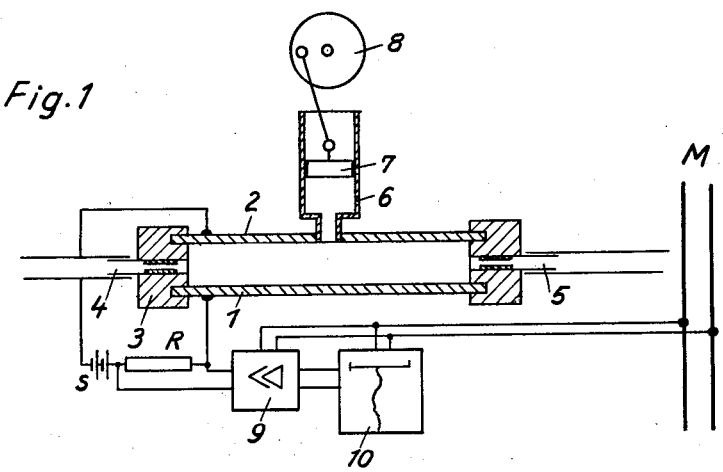
Fig. 1
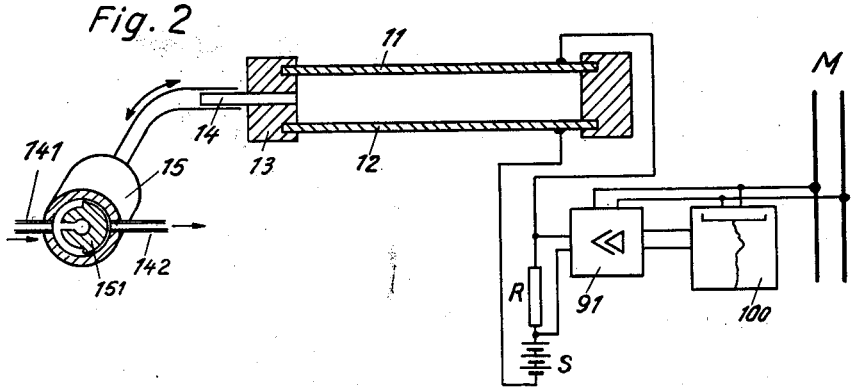
Fig. 2
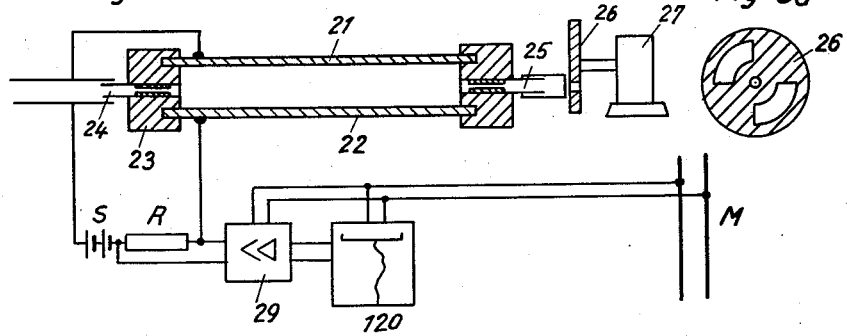 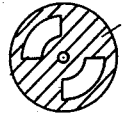
Fig. 3  Fig. 3a

United States Patent Office 3,031,616
Patented Apr. 24, 1962

3,031,616
APPARATUS FOR ANALYZING GASEOUS OR
LIQUID MIXTURES
Heinz Hummel, Johannesallee 22, Frankfurt am Main
Unterliederbach, Germany
Filed July 14, 1958, Ser. No. 748,190
Claims priority, application Germany July 18, 1957
7 Claims. (Cl. 324—61)

The invention relates to a method for analyzing gaseous or liquid mixtures as well as to a suitable device for carrying out such measurements. The method covered by the invention is particularly suitable for analyzing gas mixtures, however it can also be employed for analyzing liquid mixtures. The purpose of the invention is to provide for a method for analyzing the above mixtures without requiring complicated laboratory precision instruments and delicate components. A further purpose of the invention is to provide for a method enabling a continuous analysis of flowing media. It is furthermore intended to create an apparatus enabling an accurate and continuous analysis of mixtures and it is to be understood that such equipment must be extremely reliable in service.

The method of analysis of this invention is based on the measurement of electric properties of the medium to be tested, i.e. on the measurement of the dielectric constant of the medium. However for ascertaining the dielectric constant of the medium it has always been necessary to use extremely sensitive instruments and therefore the measurement of the dielectric constant had always to be carried out in laboratories by experienced personnel. For the purpose of analysis, especially by means of robust industrial type instruments, this method was not suitable. However the method of the invention enables tests of mixtures, particularly of gas mixtures, without necessitating complicated and delicate equipment which is difficult with respect to maintenance. The equipment described below enables an automatic measurement of the properties of a substance and automatic recording. The measurement is therefore carried out without necessitating highly experienced personnel.

The method of the invention is characterized by an electric system comprising a measuring condenser or a cavity resonator containing the substance to be measured, production of an alternating flux, the value of the alternating flux representing a measure for the concentration of the substance. The electric alternating flux can be produced by periodical changes of condition of the substance in the measuring condenser or in the cavity resonator. It has proved advantageous to choose one only measuring condenser arranged either in a D.C. voltage circuit or in a high frequency circuit.

It is also possible to use two measuring condensers, one of them being filled with a suitable reference substance, and to measure the difference of the electric alternating components produced.

The method of the invention also enables a periodical change of condition by producing an alternating pressure. For producing an alternating pressure, a periodically moved piston or a periodically controlled gas flow can be used.

In special cases it proved advantageous to produce the electric alternating flux by filling alternately the measuring condenser or the cavity resonator with the gas to be tested and a reference gas.

FIGS. 1, 2, 3 and 4 show embodiments of my invention. The illustrations show some devices for carrying out the method covered by the invention. FIG. 1 shows a cylindrical case with metal base plates 1 and 2, the shell being constituted by insulation ring 3, so that the interior of the case is sealed against atmosphere. Base plates 1 and 2 of the casing constitute at the same time the two plates of a measuring condenser. The gas to be measured flows through capillary borings 4 and 5 into the gap between the two condenser plates. Condenser plate 2 is drilled and connected to cylinder 6 in which piston 7 is moved to and fro periodically by means of crank 8. Moreover, plates 1 and 2 are connected electrically to D.C. voltage source S via resistance R. If when actuating piston 7 a periodically changing or modulated pressure is produced in the gap between condenser plates 1 and 2, the capacity of the condenser consisting of plates 1 and 2 varies periodically by a definite value being a function of the dielectric constant of the gas. Consequently an A.C. voltage is produced at resistance R and fed to amplifier 9 and indicated or recorded after amplification by means of an indicating or recording instrument 10. Therefore the output voltage of amplifier 9 represents a measure for the concentration of the gas mixture. Amplifier 9 and recorder 10 are fed with electric energy through mains M.

The equipment shown in FIG. 2 also consists of two condenser plates 11 and 12 connected by a ring of insulation material 13 and thus constituting a closed casing. The two condenser plates 11 and 12 are connected via resistance R with current source S, the voltage drops at resistance R are amplified by means of amplifier 91 and recorded by means of recorder 100. The pressure modulation in the gas to be analyzed and located between condenser plates 11 and 12 is achieved with rotating gas selector switch 15, the latter consisting of a cylindrical case with rotating slide 151 driven with a definite speed. The gas to be analysed is supplied from a container subjected to a certain pressure, whereupon the gas flows through line 141 to gas selector switch 115. With the shown position of slide 151 the gas is able to reach the gap between the two condenser plates 11 and 12 through line 14 so that the pressure of the measuring gas between the two condenser plates corresponds to the prepressure of the gas to be analysed. When turning slide 151 by 180°, line 14 is connected to line 142 leading to the atmosphere, thus enabling the measuring gas to leave the gap between the condenser plates and to escape into the open air. The gas between the condenser plates is released to atmospheric pressure. The rotating gas selector switch 151 has therefore the purpose of filling the gap between the two condenser plates 11 and 12 with fresh measuring gas under a definite pressure and then to reduce this pressure to atmospheric pressure, i.e. to discharge the gas of analysis into the atmosphere. Pressure fluctuations between the two condenser plates 11 and 12 again become effective as a change of the dielectric, thus producing again an alternating voltage drop at resistance R. These voltage fluctuations are amplified by means of amplifier 91 and recorded by means of recorder 100. They are again a criterion as to the composition of the gas to be analyzed.

The arrangement of FIG. 3 corresponds to that of FIGS. 1 and 2 as concerns the operation principle. There is again a measuring condenser consisting of plates 21 and 22, current source S, resistance R, as well as amplifier 29 and recorder 120, which as to their operation correspond to the components of FIGS. 1 and 2. The production of an alternating pressure of the measuring gas between condenser plates 21 and 22 is achieved by a periodically opened and closed discharge nozzle. The gas to be analyzed is kept under a constant prepressure and enters through line 24 into the gap between the two condenser plates 21 and 22. The gas leaves this gap through discharge nozzle 25. Before nozzle 25 a disk 26 is arranged which rotates if actuated by motor 27. Disk 26 is once more shown in FIG. 3a. On part of the surface of this disk there are recesses at the height of the discharge nozzle. Due to the rotation of disk 26 the measuring gas is able to escape periodically into the open air through discharge nozzle 26 which is then again nearly closed. The pressure fluctuations thus produced between condenser plates 21 and 22 serve for generating according to the composition of the gas a modulation of the dielectric properties of the medium between the condenser plates, thus the values indicated by the indicator or recorder 120 representing again a measure as to the composition of the gas.

FIG. 4 shows another modified arrangement covered by the invention. Condenser plates 31 and 32, the ring of insulation material 33, current source S, resistance R and amplifier 39 as well as recorder 130 again correspond to the components of FIGS. 1–3. The rotating gas selector switch 35 corresponds to switch 15 of FIG. 2 as to the mechanical construction. The line 341 leads to a container for the gas to be analyzed, whereas line 342 is connected to a container with reference gas. With the position of slide 351 shown in FIG. 4 the container for the measuring gas is connected through lines 341 and 34 with the gap between condenser plates 31 and 32, the measuring gas flows through the gap between the condenser plates and leaves the gap through line 35. If the slide 351 has been turned by 180°, the container for the reference gas is connected with the gap between the condenser plates through lines 342 and 34. With this position of slide 351 the reference gas flows through the gap between condenser plates 31 and 32 and escapes into the open air through line 35. Therefore two different gases, the measuring gas and the reference gas, are flowing alternately through the gap between the condenser plates. Due to the changing dielectric, voltage drops varying per unit time are produced at resistance R, said voltage drops being amplified by amplifier 39 and indicated as well as recorded by instrument 130. With a constant composition of the reference gas the indication again represents a measure for the composition of the gas to be analyzed.

The apparatus is used predominantly for the analysis of gas mixtures containing two gas components. Furthermore this method enables the absolute determination of the dielectric and the para-electric susceptibility.

The following examples are given for explaining further the principle covered by this invention. For measuring ammonia in air (measuring range 0+15%) an equipment as shown in FIG. 2 is used. The gas to be analysed is fed to rotating gas selector switch 15 (6 rotations per second) with a constant prepressure of 1000 mm. WC. The measuring condenser consists of two circular plates of 40 mm. diameter and 0.1 mm. distance between the plates.

For supervising the content of ammonia of a nitrogen—hydrogen mixture of varying composition (measuring range 0–5% ammonia) the same type of equipment is used. In this case the indication represents an unmistakable measure for the content of ammonia in spite of the fluctuating composition of nitrogen and hydrogen. This result is not obtained with gas density balances or thermal conductivity meters.

Gas chromatography is a further field of application for the apparatus covered by the invention. For this purpose an analyzer is required responding to different components of a mixture with several components. For such measurements a quick response time and the small size of the apparatus are of special importance. Both requirements are met when using the equipment described above.

I claim:

1. An apparatus for analyzing fluids having components differing in a manner relative to their dielectric constants and comprising an electrical condenser having spaced electrodes for providing a fluid space therebetween, means for substantially confining fluid between the electrodes, means for the entry of fluid to the zone between the electrodes, a source of direct current connected to the respective electrodes for charging the condenser to bring the condenser into electrical equilibrium with the source, means for modulating the pressure of fluid between the electrode to change periodically the capacity of the condenser to modulate the point of electrical equilibrium between the source and condenser and to produce an alternating current therebetween, and means for measuring the alternating current for indicating the dielectric constant of the fluid and in terms of the composition of the fluid between the electrodes.

2. An apparatus for analyzing fluids for components each differing under pressure changes in a manner relative to their dielectric constants and comprising an electrical condenser having spaced electrodes for providing a fluid space therebetween, means for confining fluid between the electrodes, means for admitting fluid to the zone between the electrodes, source means for applying a difference of potential to the respective electrodes, means for modulating the pressure of fluid between the electrodes to change cyclically the dielectric constant of the fluid and the capacity of the condenser to modulate current flow between the source means and the condenser, and means for sensing the modulation of current flow between the source means and condenser to indicate change in the dielectric constant and in terms of the composition of the fluid between the electrodes.

3. An apparatus for analyzing fluids having components differing from each other with respect to their dielectric constants and comprising an electrical condenser having spaced electrodes for providing a fluid space therebetween, means for substantially confining fluid between the electrodes, means for the entry and exit of fluid to and from between the electrodes, source means for applying a difference of potential to the respective electrodes, means for cyclically changing the pressure of fluid between the electrodes to change cyclically the capacity of the condenser at least partially according to the composition of the fluid to cyclically change flow of current between the source means and the condenser, and means for sensing the change of flow of current between the source means and condenser to indicate the composition of the fluid between the electrodes.

4. An apparatus for analyzing fluids for components having differences relative to their dielectric constants and comprising an electrical condenser having spaced electrodes for providing a fluid space therebetween, means for directing fluid to the zone between the electrodes, source means for applying a difference of potential to the respective electrodes, means for modulating the pressure of fluid between the electrodes to change cyclically the capacity of the condenser in accordance with the pressure of the fluid to modulate flow of electrical current between the source means and the condenser, and means for sensing the modulation of the flow of current between the source means and condenser to indicate the composition of the fluid between the electrodes.

5. An apparatus as claimed in claim 2, said means for modulating the pressure being a reciprocatory piston and cylinder therefor and means for transmission of fluid pressure between the cylinder and zone between the electrodes.

6. An apparatus as claimed in claim 2 and means for leading fluid under pressure through the means for admitting fluid to the zone, an exit tube connected to the condenser for discharge of fluid from between the electrodes, said means for modulating the pressure of the fluid being a means for cyclically at least partially closing and opening the tube to allow the fluid to discharge.

7. An apparatus as claimed in claim 3, said means for entry and exit of the fluid being a tube, structure surrounding the electrodes and forming at least a part of a fluid-tight chamber, the tube being in communication with the interior of the chamber, and means for conducting test fluid under pressure to said tube and inducting a three-way valve as said means for modulating the pressure of fluid between the electrodes.

(References on following page)

References Cited in the file of this patent

UNITED STATES PATENTS

| | | |
|---|---|---|
| 1,697,339 | Baker | Jan. 1, 1929 |
| 2,349,992 | Schrader | May 30, 1944 |
| 2,402,119 | Beggs | June 18, 1946 |
| 2,472,814 | Elliott | June 14, 1949 |
| 2,485,579 | Elliott | Oct. 25, 1949 |
| 2,499,020 | Fearon | Feb. 28, 1950 |
| 2,560,952 | Herold | July 17, 1951 |
| 2,602,838 | De BoisBlanc et al. | July 8, 1952 |
| 2,792,548 | Hershberger | May 14, 1957 |

OTHER REFERENCES

Lovering et al.: "A Bridge for the Measurement of the Dielectric Constants of Gases," Proc. of IEE, part II, vol. 98, August, 1951; pages 557–563.

McCall, "Cell for the Determination of Pressure Coefficients of Dielectric Constant and Loss of Liquids and Solids at 10,000 p.s.i."; The Review of Scientific Instruments, vol. 28, No. 5, May, 1957, pages 345–351.